United States Patent
Chefd'hotel et al.

(10) Patent No.: US 8,098,911 B2
(45) Date of Patent: Jan. 17, 2012

(54) METHOD AND SYSTEM FOR REGISTRATION OF CONTRAST-ENHANCED IMAGES WITH VOLUME-PRESERVING CONSTRAINT

(75) Inventors: Christophe Chefd'hotel, Jersey City, NJ (US); Kinda Anna Saddi, Princeton, NJ (US)

(73) Assignee: Siemens Aktiengesellschaft, München (DE)

( * ) Notice: Subject to any disclaimer, the term of this patent is extended or adjusted under 35 U.S.C. 154(b) by 1085 days.

(21) Appl. No.: 11/945,337

(22) Filed: Nov. 27, 2007

(65) Prior Publication Data
US 2009/0080779 A1 Mar. 26, 2009

Related U.S. Application Data

(60) Provisional application No. 60/872,905, filed on Dec. 5, 2006.

(51) Int. Cl.
*G06K 9/32* (2006.01)
(52) U.S. Cl. ........ 382/128; 382/131; 382/294; 382/289; 382/295
(58) Field of Classification Search .................. 382/128, 382/131, 236, 254, 276, 278, 289, 294, 295
See application file for complete search history.

(56) References Cited

U.S. PATENT DOCUMENTS

| | | | |
|---|---|---|---|
| 7,483,034 B2 * | 1/2009 | Chefd'hotel et al. | 345/582 |
| 7,616,836 B2 * | 11/2009 | Valadez | 382/294 |
| 2008/0050043 A1 * | 2/2008 | Hermosillo Valadez et al. | 382/294 |

OTHER PUBLICATIONS

E. Haber and J. Modersitzki, "Numerical methods for volume preserving image registration," Inverse Problems 20, (1621-1638), 2004.
E. Haber and J. Modersitzki, in "A scale space method for volume preserving image registration," in ScaleSpace, 2005.
B. Fischer et al., "Large scale problems arising from image registration," GAMM Mitteilungen Applied and Numerical Linear Algebra 27, pp. 104-120, Dec. 2004; TR-2004-027-A to appear in GAMM Mitteilungen 2005.

* cited by examiner

*Primary Examiner* — Phillip A Johnston
*Assistant Examiner* — Michael Logie
(74) *Attorney, Agent, or Firm* — Donald B. Paschburg

(57) ABSTRACT

A method and system for registering a first image of, for example, a liver and a second image of the liver being contrast-enhanced comprises: deriving a statistical similarity measure between images; deriving a smooth divergence-free vector field derived from a gradient of the statistical similarity measure; and integrating the vector field for providing a fluid-based algorithm including a volume-preserving constraint for a transformation for registering the images.

17 Claims, 7 Drawing Sheets

METHOD AND SYSTEM FOR REGISTRATION OF CONTRAST-ENHANCED IMAGES WITH VOLUME-PRESERVING CONSTRAINT

CROSS-REFERENCE TO RELATED APPLICATIONS PRIORITY

Specific reference is hereby made to U.S. Provisional Patent Application No. 60/872,905, entitled: Large deformation registration of contrast-enhanced images with volume preserving constraint, filed Dec. 5, 2006 in the names of CHRISTOPHE CHEFD'HOTEL and KINDA ANNA SADDI, the inventors in the present application, and of which the benefit of priority is claimed and whereof the disclosure is hereby incorporated herein by reference.

FIELD OF THE INVENTION

The present application relates generally to image registration and, more particularly, to registration of medical images such as contrast enhanced medical images.

BACKGROUND OF THE INVENTION

Perfusion imaging provides the ability to measure variation in organ blood flow. Essentially, it comprises acquiring a sequence of images as a contrast agent flows in the organ of interest. This offers complementary information for diagnosing pathologies, and is particularly relevant in identifying liver lesions and malignancies. By way of a non-limiting example, computed tomography (CT) perfusion of the liver is herein considered. A hepatic perfusion study generally comprises at least three volume image acquisitions, corresponding respectively to the native (no contrast enhancement), hepatic arterial, and portal venous phases of the blood flow in the liver. See FIG. 1, in which (a) shows the native phase without contrast enhancement, (b) shows the arterial phase of enhancement, and (c) shows the venous phase of enhancement.

Such a complete study generally cannot practicably be done during a single breath-hold, and thus generally results in breathing artifacts. Cardiac and peristaltic motions can also cause geometric distortions between successive acquisitions. In order to compensate for the resulting soft tissue deformations, a suitable motion correction is required to obtain accurate perfusion measurements. See P. V. Pandharipande et al., "Perfusion imaging of the liver: current challenges and future goals," *Radiology* 234(3), pp. 661-73, 2005. Such a motion correction generally comprises applying an image-based registration algorithm that finds an optimal non-rigid transformation aligning a pair of volumes by maximizing a suitable similarity measure. The specifics of liver perfusion imaging make this task particularly challenging. Typically, intensity values of some of the liver's tissue and arteries can be locally and drastically affected by the contrast agent intake. It is important to note that geometric distortions are highly non-rigid and can be of very large amplitude. In addition, the size and number of the volumes to be registered preferably requires a computationally efficient technique that performs the retrospective motion correction in an amount of time compatible with a clinician's workflow.

The use of standard registration techniques using the sum of squared differences to measure the quality of alignment tends to artificially shrink or expand contrast-enhanced structures. While one can partially mitigate this problem using more advanced statistical similarity measures, a different strategy is used herein to address this problem. Under certain simplifying assumptions, the liver can be modeled as an incompressible organ.

Non-rigid image registration techniques have been widely studied in the field of medical imaging. See, for example, D. Hill et al., "Medical image registration," *Physics in Medicine and Biology* 26, pp. R1-R45, 2001; W. Crum et al., "Non-rigid image registration: Theory and practice," *British Journal of Radiology* 77(2), pp. 140-153, 2004; J. Modersitzki, *Numerical methods for image registration*, Oxford University Press, 2004. A well-known intensity-based algorithm is the free-form deformation (FFD) described by Rueckert et al. "Non-rigid registration using free-form deformations: application to breast MR images," *IEEE Trans. Med. Imaging* 18(8), pp. 712-721, 1999. The algorithm starts with an affine registration, to improve the capture range, and then recovers the non-rigid deformations based on a B-Spline model. G. E. Christensen et al., "Deformable templates using large deformation kinematics," *IEEE Transactions on Medical Image Processing* 5(10), pp. 1435-1447, 1996, introduced an algorithm based on a viscous fluid partial differential equation (PDE), that captures large deformations.

Variations of the fluid method, to improve the computational costs, have been proposed in: M. Bro-Nielsen et al., "Fast fluid registration on medical images," *Visualization in Biomendical Computing* 3, pp. 267-276, 1996; E. D'Agostino et al., "A viscous fluid model for multimodal non-rigid image registration using mutual information," in *MICCAI*, pp. 541-548, 2002; and Crum et al., "Anisotropic multi-scale fluid registration; evaluation in magnetic resonance breast imaging," *Physics in Medicine and Biology* 50, 5153-5174, November 2005.

As often used in computational anatomy (see M. I. Miller et al., "Geodesic shooting for computational anatomy," *J. of Mathematical Imaging and Vision* 24(2), pp. 209-228), 2006, the registration process can be reformulated in a geometric context. See A. Trouvé, "Diffeomorphisms and pattern matching in image analysis," *Int. J. Computer Vision* 28(3), pp. 213-221, 1998; and M. I. Miller and L. Younes, "Group actions, homeomorphisms, and matching: A general framework," *Int. J. Comput. Vision* 41(1-2), pp. 61-84, 2001. Beg et al. reformulated Christensen's approach as a gradient flow on a group of diffeomorphisms. See Beg et al., "Computing large deformation metric mappings via geodesic flows of diffeomorphisms," *Int. J. Computer Vision* 61, pp. 139-157, February 2005.

Material on the terminology of B-splines may be found in various published works such as, for example, in *Medical Image Registration*, by Joseph B. Hajnal et al., CRC Press, New York; 2001, pp. 65 and 286 et seq. and on affine concepts in the aforementioned book by Hajnal and, for example, in *Geometry*, by Dan Pedoe, Dover Publications, New York, 1970, pp. 351 et seq. and pp. 397 et seq.

Some of the previous techniques have been extended to handle various constraints. Registration is considered with topology preservation, see O. Musse et al., "Topology preserving deformable image matching using constrained hierarchical parametric models," *IEEE Trans. on Image Processing* 10, pp. 1081-1093, July 2001; and V. Noblet et al., "3-D deformable image registration: a topology preservation scheme based on hierarchical deformation models and interval analysis optimization," *IEEE Trans. on Image Processing* 14(5), pp. 553-566, 2005; or with local rigidity, see D. Loeckx et al, "Nonrigid registration using free-form deformations with a local rigidity constraint," in *MICCAI*, pp. 639-646, 2004; and M. Staring et al., "Nonrigid registration using a rigidity constraint," in *SPIE Medical Imaging: Image Processing, J. M Reinhardt and J. P. W. Pluim, eds., *Proceedings of SPIE* 6144, pp. 614413-1-614413-10, SPIE Press, (San Diego, Calif., USA) February 2006.

T. Rohlfing et al., "Volume-preserving non-rigid registration of MR breast images using free-form deformation with an incompressibility constraint," *IEEE Trans. Med. Imaging* 22(6), pp. 730-741, 2003 introduced an incompressibility constraint as a penalty term to the FFD model described. The constraint is defined as the integral of the absolute logarithm of the Jacobian determinant over the transformation domain.

In contrast, E. Haber and J. Modersitzki, "Numerical methods for volume preserving image registration," *Inverse Problems* 20, (1621-1638), 2004 presented a volume-preserving constrained optimization, where they derived the Euler-Lagrange equations. Later, E. Haber and J. Modersitzki, in "A scale space method for volume preserving image registration," in *ScaleSpace*, 2005 proposed a linearization of the constraint problem that solves a sequence of quadratic constrained optimizations. This amounts to the integration of the volume-preserving constraint in a fluid variational framework.

It is herein recognized that there exists a lack of efficient and reliable tools to cope efficiently with the foregoing issues.

BRIEF SUMMARY OF THE INVENTION

An object of the present invention is to address the present lack of efficient and reliable tools to cope efficiently with the foregoing issues.

In the foregoing context, it is herein recognized that a registration method that preserves the volume of substructures, including contrast-enhanced regions, is desirable. In accordance with a principle of the present invention, this constraint is integrated in a flexible and efficient non-rigid registration technique offering a large capture range.

An aspect of the present invention relates to an image registration method for the alignment of contrast-enhanced CT images, in two dimensions and in three dimensions, utilizing a fluid-based registration algorithm designed to incorporate a volume-preserving constraint. In this aspect, the invention is deemed particularly useful in the case of contrast-enhanced liver CT images and images of similar organs.

An object of the invention is to recover accurate non-rigid transformations in perfusion studies between contrast-enhanced structures. Another object of the invention is to preserve the incompressibility of, for example, liver tissues.

In accordance with another aspect of the invention, the transformation is obtained by integrating a smooth divergence-free vector field derived from the gradient of a statistical similarity measure.

In accordance with another aspect of the invention, this gradient is regularized with a fast recursive low-pass filter and is projected onto the space of divergence-free vector fields using a multigrid solver.

Another object of the invention is to prevent the shrinkage of contrast-enhanced regions as typically observed with standard fluid methods by adding an incompressibility constraint; this is done by projecting the regularized gradient into the space of divergence-free vector fields.

In accordance with an aspect of the invention, a method for registering images, comprises: (a) acquiring a reference image and a study image; (b) setting a deformation field to an initial deformation field; (c) deriving a similarity measure from the reference and study images and the initial deformation field; (d) computing a displacement field from the similarity measure; (e) smoothing the displacement field to derive a regularized displacement field; (f) applying a volume constraint to the regularized displacement field to derive a constrained displacement field; and (g) utilizing the constrained displacement field and the initial deformation field for deriving an updated deformation field.

In accordance with another aspect of the invention, a method for registering images, comprises: (a) acquiring a reference image and a study image; (b) setting a deformation field to an initial deformation field; (c) deriving a similarity measure from the reference and study images and the initial deformation field; (d) computing a displacement field from the similarity measure; (e) smoothing the displacement field to derive a regularized displacement field; (f) applying a volume constraint to the regularized displacement field to derive a constrained displacement field; (g) utilizing the constrained displacement field and the initial deformation field for deriving an updated deformation field; (h) deriving an updated similarity measure value from the reference and study images and the updated deformation field; (i) computing an updated displacement field from the updated similarity measure; (j) smoothing the updated displacement field to derive an updated regularized displacement field; (k) applying a volume constraint to the updated regularized displacement field to derive an updated constrained displacement field; (l) utilizing the updated constrained displacement field and the updated deformation field for deriving a further updated deformation field; and (m) iteratively performing steps (h) through (m) until an end condition is met, whereupon ending iteration and outputting a furthest updated deformation field.

In accordance with another aspect of the invention, step (b) for setting a deformation field to an initial deformation field comprises setting the deformation field to zero.

In accordance with another aspect of the invention, a method for registering images as explained herein, and for performing steps of the method, using a coarse-to-fine performance strategy: in a first performance in a relatively coarse resolution; in subsequent performances in respective progressively finer resolutions; wherein, for the first performance, the step (b) comprises setting the deformation field to zero; and wherein, for each of the subsequent performances, the step (b) comprises setting the deformation field to a respective updated deformation field from the immediately preceding performance.

In accordance with another aspect of the invention, step (c) for deriving a similarity measure value comprises deriving the sum of squared differences, local cross-correlation, and mutual information for the images.

In accordance with another aspect of the invention, the step (d) for computing a displacement field comprises deriving the gradient of the similarity measure, and determining the displacement field as following the gradient.

In accordance with another aspect of the invention, the step (e) for smoothing the displacement field comprises utilizing a fast recursive filtering technique approximating a Gaussian smoothing.

In accordance with another aspect of the invention, a method for registering a first image of a liver and a second image of said liver being contrast-enhanced, comprises: deriving a statistical similarity measure between images; deriving a smooth divergence-free vector field from a gradient of said statistical similarity measure; and integrating said vector field for providing a fluid-based algorithm including a volume-preserving constraint for a transformation for registering said images.

In accordance with another aspect of the invention, a method for registering first and second images as, comprises: smoothing said gradient to obtain a regularized gradient; and projecting said regularized gradient into a space of divergent-free vector fields, comprising solving a Poisson equation with an efficient multi-grid method.

In accordance with another aspect of the invention, a computerized system for registering a first digital image of an organ and a second digital image of the organ being contrast-enhanced comprises: a memory device for storing a program and other data; and a processor in communication with the memory device, the processor being operative with the program to perform:

(a) acquiring a reference image and a study image;
(b) setting a deformation field to an initial deformation field;
(c) deriving a similarity measure from the reference and study images and the initial deformation field;
(d) computing a displacement field from the similarity measure;
(e) smoothing the displacement field to derive a regularized displacement field;
(f) applying a volume constraint to the regularized displacement field to derive a constrained displacement field;
(g) utilizing the constrained displacement field and the initial deformation field for deriving an updated deformation field;
(h) deriving an updated similarity measure value from the reference and study images and the updated deformation field;
(i) computing an updated displacement field from the updated similarity measure;
(j) smoothing the updated displacement field to derive an updated regularized displacement field;
(k) applying a volume constraint to the updated regularized displacement field to derive an updated constrained displacement field;
(l) utilizing the updated constrained displacement field and the updated deformation field for deriving a further updated deformation field; and
(m) iteratively performing steps (h) through (m) until an end condition is met, whereupon ending iteration and outputting a furthest updated deformation field.

In accordance with another aspect of the invention, a system for registering images essentially as set forth in the foregoing paragraph, operates in a coarse-to-fine framework as follows: in a first operation in a relatively coarse resolution; in subsequent operations in respective progressively finer resolutions; wherein, for the first operation, the setting of a deformation field to an initial deformation field comprises setting the deformation field to zero; and wherein, for each of the subsequent operations, the setting of a deformation field to an initial deformation field comprises setting the deformation field to a respective updated deformation field from the immediately preceding operation.

It is noted that an incompressibility constraint is essentially similar to a volume-preserving constraint. While the term volume-preserving constraint may tend more to connote a 3D environment, for convenience, the term volume-preserving constraint is generally retained and when applied herein to a 2D environment, it is to be understood and construed in the nature of an incompressibility constraint, also referred to as an area-preserving constraint when it pertains to a 2-D environment.

BRIEF DESCRIPTION OF THE DRAWINGS

The invention will be more fully understood from the detailed description following, including exemplary embodiments, in conjunction with the drawings, in which.

DETAILED DESCRIPTION OF THE INVENTION

Figure 1:
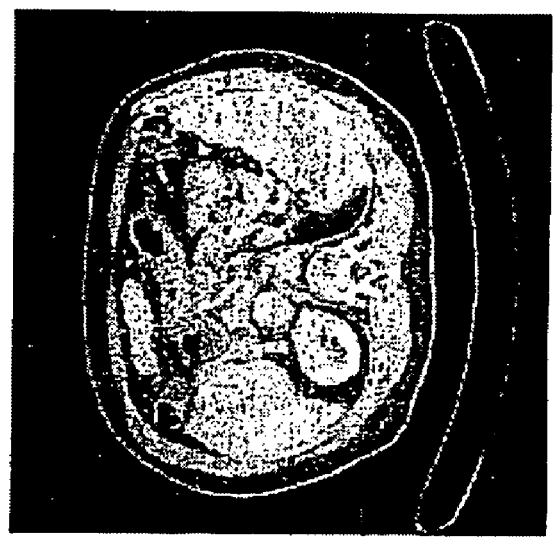
FIG. 1 shows CT images of a liver in a perfusion study, helpful to a better understanding of the present invention.
Figure 1:
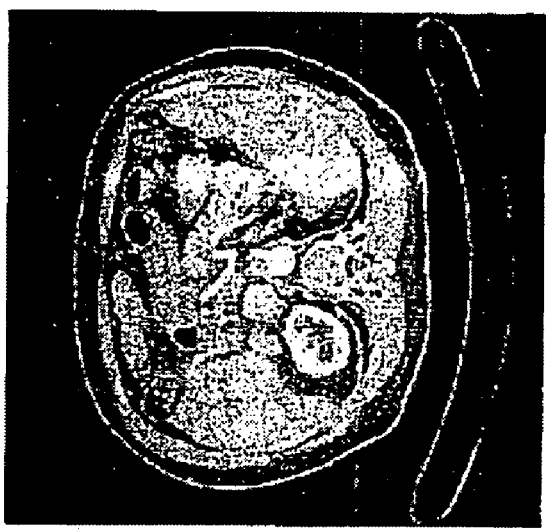
Figure 1:
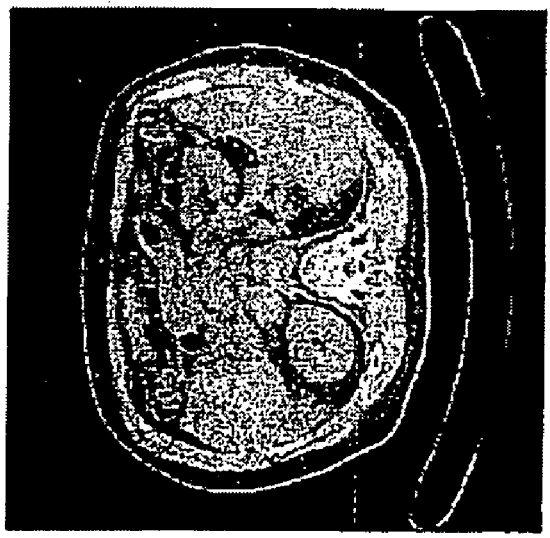

The principles and operation of the present invention will also be described in terms of exemplary embodiments; this is for convenience and clarity in the explanation and is not intended to limit or constrain the invention to such exemplary embodiments and should not only be so construed.

Briefly, a registration process in accordance with principles of the invention builds a flow of volume-preserving smooth and invertible transformations, in conjunction with certain known concepts. An algorithm is disclosed that considers different similarity measures and uses a fast recursive filter to guarantee the smoothness of the transformation. The divergence-free constraint is imposed on the vector fields that generate the transformation, and a (quasi) volume-preserving deformation is obtained. A quasi volume-preserving deformation is referred to because of numerical discretization and approximation. Certain aspects bear a similarity to the disclosure in the aforementioned paper by Haber et al. in *ScaleSpace*, but the present invention introduces an efficient algorithm that copes with large scale datasets, where we decouple the constraint from the regularization step. See B. Fischer et al., "Large scale problems arising from image registration," *GAMM Mitteilungen Applied and Numerical Linear Algebra* 27, pp. 104-120, December 2004; TR-2004-027-A to appear in GAMM Mitteilungen 2005.

Given a reference and a study image $I_1, I_2: \Omega \subset R^d \to R (d=2, 3)$, the registration problem is formulated as finding a volume-preserving (or area-preserving in 2D) diffeomorphism $\phi: \Omega \to \Omega$ that maximizes a similarity measure $S(I_1, I_2 \circ \phi)$, where $\phi$ represents a deformation field. The sum of squared differences (SSD), local cross-correlation (LCC) and mutual information (MI) criteria are considered. The method in accordance with the present invention finds a diffeomorphism that relates $I_1$ and $I_2$.

We build a sequence of diffeomorphism $(\phi_k)_{k=0,\ldots,+\infty}$, by composition of small displacements $$\phi_{k+1} = \phi_k \circ (\phi_{id} + \alpha v_k) \qquad (1)$$

where $\phi_0 = \phi_{id}$ and $v_k$ is a velocity vector field that follows the gradient of the similarity measure and $\phi_{id}$ the identity map. See C. Chefd'Hotel, G. Hermosillo, and O. Faugeras, "Flows of diffeomorphisms for multimodal image registration," in *Proceedings of the IEEE International Symposium on Biomedical Imaging*, 2002. The velocity vector field $v_k$ is obtained in three steps. First, we compute the variational gradient of S. See G. Hermosillo, C. Chefd'Hotel, and O. Faugeras, "A variational approach to multi-modal image matching," Tech. Rep. 4417, INRIA, 2001. Then, this gradient has to be regularized to ensure a well-posed problem. The regularization is performed using a fast recursive filtering technique that approximates a Gaussian smoothing. See R. Deriche, "Recursively implementing the Gaussian and its derivatives," *Proceedings of the Second International Conference on Image Processing*, pp. 263-267, (Singapore), September 1992. Finally, the regularized gradient $v_k$ is projected onto the space of the divergence-free vector field using Helmholtz-Hodge decomposition. This amounts to subtracting a scalar field $\nabla p$ from $v_k$, where p is a solution of the Poisson equation $\nabla \cdot v_k = \Delta p$, solved using an efficient multigrid method.

The foregoing iterative scheme is repeated until convergence, and can be seen as the discretization (via Taylor expansion) of the transport equation in the Eulerian frame:

$$\frac{\partial \phi_t}{\partial t} = -D\phi_t \cdot v, \phi_0 = \phi_{id} \qquad (2)$$

under the constraint $\nabla \cdot v = 0$. $D\phi_t$ stands for the Jacobian matrix of $\phi_t$. This Eulerian frame has an advantage over the Lagrangian frame: it is more stable since the computations are performed on a fixed grid.

The key of the Helmholtz-Hodge decomposition theorem is the splitting of a vector field into the set of the divergence-free vector field and its complement. The theorem states that a vector field v can be considered to be generated by a unique pair of potentials: a divergence-free vector potential $v_{div=0}$ and a scalar potential p. Thus, $$v = v_{div=0} + \nabla p \qquad (3)$$

where $\nabla \cdot v_{div=0} = 0$ is the divergence-free vector field and p is a scalar field. By computing the divergence of the vector field v, we have $\nabla \cdot v = \nabla \cdot v_{div=0} + \nabla \cdot \nabla p = \Delta p$. Then, we obtain p by solving the Poisson equation $\nabla \cdot v = \Delta p$. Hence, the free-divergence vector field is obtained using $v_{diV=0} = v - \nabla p$.

In a continuous setting, the divergence-free constraint on v guarantees that the resulting transformation will be volume-preserving (area-preserving in 2D). In practice however, the constraint cannot be enforced completely due to various levels of approximation, such as the time discretization of the equation and the numerical approximation of the projection step.

In order to drive the registration process, we use the gradient of three similarity measures. The sum of squared differences (SSD) is very popular as a similarity measure due to its simplicity and fast computation. For a given point, we compute the squared difference of the voxel intensities in both images $I_1$ and $I_2$. The local cross correlation (LCC) similarity measure assumes a local linear relationship between the intensity values based on the correlation coefficient. Mutual information (MI) assumes statistical dependence between the intensities of the images, measured through the joint entropy. This indicates how related, that is, less independent, the images are. Two unrelated images will yield a joint entropy equal to the sum of the individual image entropies. The lower the joint entropy is with respect to the individual entropies, the more related the two images are. See the aforementioned publication by D. Hill et al.

The method described above can be summarized as follows in Table 1:

TABLE 1

Algorithm 1 Large deformation registration algorithm
Input: $I_1, I_2$, and $\sigma$ TABLE 1-continued Output: $\phi_k$ final diffeomorphic map.
1. $\phi_0 = \phi_{id}$
2. while k < max_iter or convergence not reached do
3.   compute $v_k = \nabla S(I_1, I_2 \circ \phi_k)$
4.   regularize $v_k$ with a Gaussian filter $G_\sigma, v_k = G_\sigma * v_k$
5.   find p by solving $\nabla \cdot v_k = \Delta p$
6.   find the volume-preserving field $v_k = v_k - \nabla p$
7.   set $\alpha$ to ensure a displacement smaller than a voxel
8.   update $\phi_{k+1} = \phi_k \circ (\phi_{id} + \alpha v_k)$
9.   update k = k + 1
10. end while We developed a C++ implementation of Algorithm 1. For the implementation of the variational gradients $\nabla S(I_1, I_2 \circ \phi_k)$, (step 3.). See the aforementioned publication by Hermosillo et al. For example, let $S_{SSD}$ denote the Sum of Squared Differences (SSD) between $I_1$ and $I_2 \circ \phi$, $$S_{SSD}(I_1, I_2 \cdot \phi) = \frac{1}{2} \|I_1 - I_2 \cdot \phi\|^2_{L_2(\Omega)}. \qquad (4)$$

By applying the calculus of variations on Equation 4, we obtain the associated gradient $$\nabla S_{SSD}(I_1, I_2 \circ \phi) = (I_1 - I_2 \circ \phi) \nabla I_2 \circ \phi \qquad (5)$$

For the regularization of the vector field $v_k$ (step 4.) we use the Deriche's recursive filter (see the aforementioned publication by R. Deriche) that approximates a Gaussian filter (as proposed by D'Agostino et al. in the aforementioned publication, where $\sigma$ is the standard deviation. The solution of the Poisson equation $\nabla \cdot v_k = \Delta p$, (step 5.), used for the projection into the divergence-free vector field, is implemented with a full multigrid method. See W. L. Briggs et al. *A multigrid tutorial*, Society for Industrial and Applied Mathematics, Philadelphia, Pa., USA, second edition ed. 2000.

Finite-difference schemes, such as the gradient and the divergence, are implemented using second order approximations. The algorithm stops when the maximum number of iterations is reached, or when the similarity cost stops decreasing. The similarity cost is the sum of the similarity measure over the domain of the image. The algorithm is based on a coarse-to-fine strategy. It reduces the computational cost by working with less data at lower resolution. It also allows the recovery of large displacements, corresponding to improved capture range, and avoids local minima.

Working with CT perfusion studies implies operating large scale datasets. This explains in particular the choice of the fast recursive that approximates the Gaussian regularization. This fast filter has a linear complexity with respect to the number of voxels. Likewise, classical relaxation (iterative) methods to solve the Poisson equation, such as Jacobi's or Gauss-Seidel, have slow convergence rates, and are unsuitable in our registration process. Other methods, such as Fourier transform can be efficient for specific data sizes but are inappropriate for this work. Multigrid methods are efficient solvers and are very attractive.

Multigrid approaches create a fine-to-coarse hierarchy of equation systems, solved with a Gauss-Seidel relaxation. These techniques have excellent error reduction properties. An estimated error at a coarser grid is used to correct the approximated solution on the current grid. Low frequencies on the finest grid reappear as higher frequencies on coarser grids, where they can be successfully removed. This hierarchical system is called V-cycle, and computes accurate results much faster than non-hierarchical solvers. Repeating the V-cycle at each level yields a W-cycle that has better convergence although computational costs are slightly increased. Starting with a coarse version of the original equation system and transferring the coarse solutions as an initial guess for finer levels is known as a full multigrid, and it has the best performance. Our implementation is based on such a full multigrid approach with 2 W-cycles per level; each W-cycle has 2 iterations performed for the pre- and post-relaxations. More details on the multigrid methods and their parameters can be found in the aforementioned publication by W. L. Briggs et al.

Figure 2:
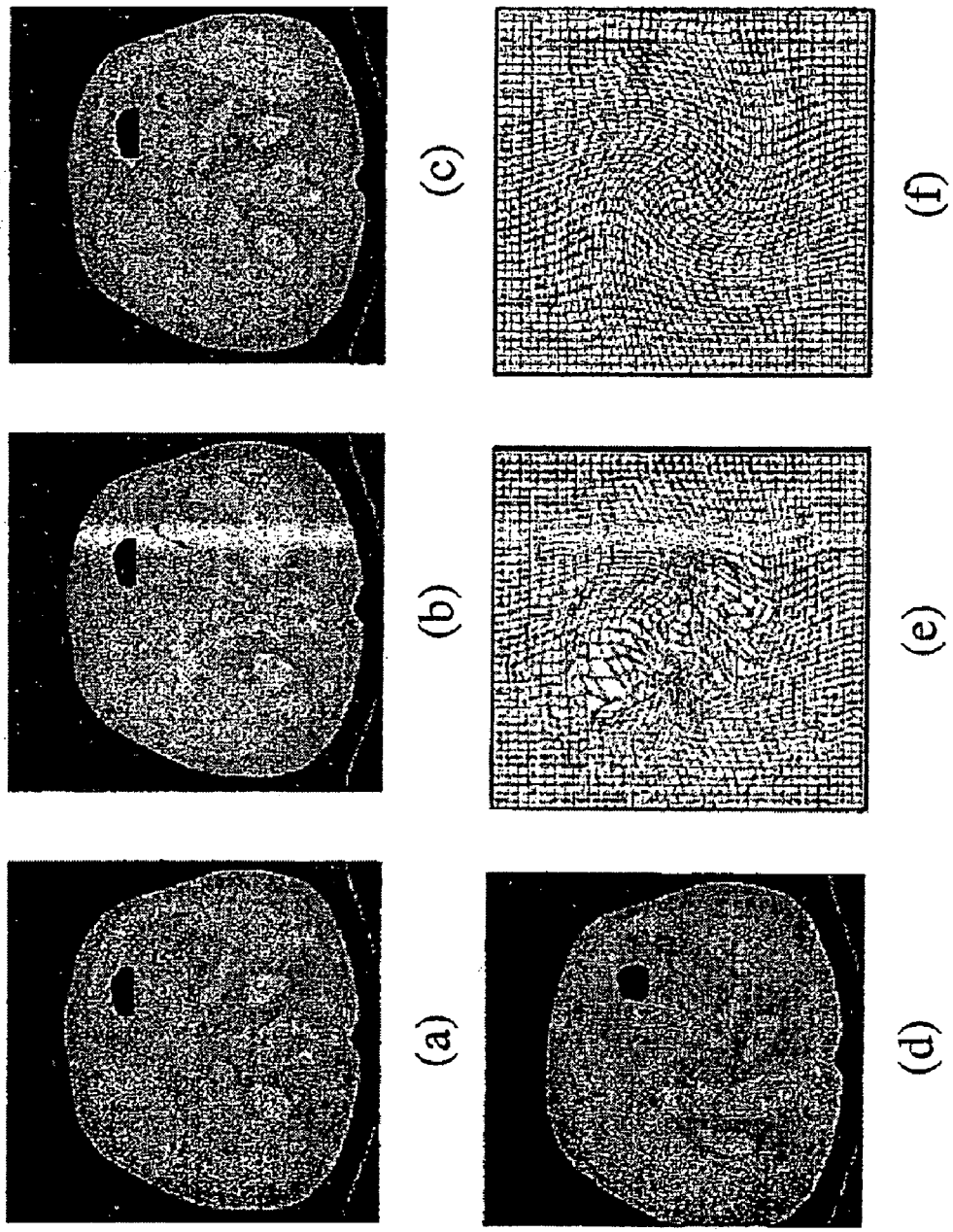
FIG. 2 shows image registration results on simulated area-preserving transformation.

FIG. 2 shows registration results on simulated area-preserving transformation. In FIG. 2, (a) shows a reference image, (b) shows a registered study image with no constraint, (c) shows a registered study image with constraint, (d) shows the study image, (e) shows the deformation field φ without constraint, and (f) shows the deformation field φ with constraint.

When working with two-dimensional images we impose the area-preserving constraint that is equivalent to the volume-preserving constraint in three dimensions. We first generated a study image using a simulated area-preserving function, a whirl on a circular area. Points which are at radius distance from the center remain where they are, and the center point rotates the full whirl angle $α_w$. Every point within a radius distance of the whirl center is rotated with an angle $$\alpha = \alpha_w * \left(1 - \frac{\text{distance}}{\text{radius}}\right)^2.$$

A byproduct of the incompressibility constraint features is the improvement of the registration capture range.

The registration with the area-preserving constraint recovered the right deformation field, whereas it showed misalignments without the constraint and got trapped in local minima (FIG. 2). The target registration error (L2 norm), computed by comparing the transformation estimates produced by the volume-preserving registration and the known whirl transformation, is about 0.01 mm.

Figure 3:
FIG. 3 shows registration of contrast-enhanced CT images (liver study example)
Figure 3:
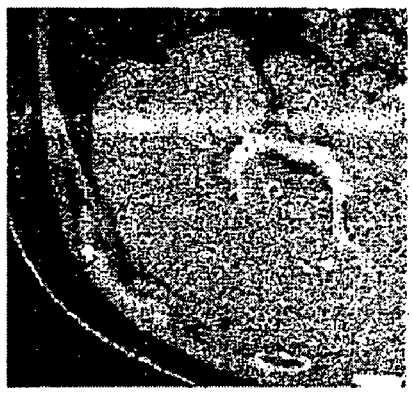
Figure 3:
Figure 3:
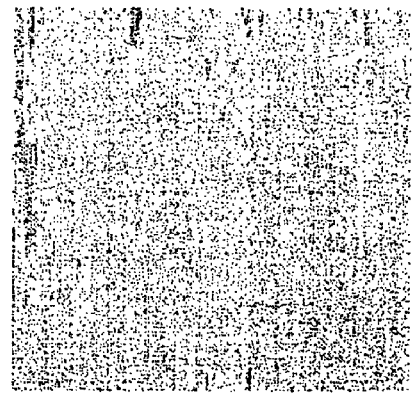
Figure 3:
Figure 3:

Next, we performed experiments on liver slices 512×512 pixels (here we are in 2D) extracted from real datasets. FIG. 3 shows registration of contrast-enhanced CT images (liver study example). In FIG. 3, (a) shows a reference image, (b) shows a study image after registration, without constraint, (c) shows the study image after registration, with constraint, (e) shows a study image, (f) shows the Jacobian of the deformation field φ, without consraint, and (g) shows the Jacobian of the deformation field φ, with constraint. We used the SSD as a similarity measure in the registration. We registered the venous state to the native state (no contrast agent). FIG. 3 shows that the area-preserving constraint conserves intensity changes while the fluid registration (no constraint) tries to shrink the contrast-enhanced region. The Jacobian determinant of the retrieved area-preserving deformation is close to 1. A Jacobian determinant equal to 1 means that the deformation is incompressible, as for the case shown in (g). As predicted, there was no local expansion or compression.

Our preliminary results revealed that the proposed algorithm is low-dependent on the regularizer (Gaussian smoothing) parameter. For different values (we varied sigma between 2 and 6), registrations attained convergence and segmentations (level-set-based) of the contrast-enhanced region recorded volume variations below 1%. The area-preserving registration process is computationally efficient: it costs about 2.2 times more per iteration compared to the approach without constraint. While our preliminary experiments indicate that the algorithm reaches the stopping condition faster than without the constraint, the real example, FIG. 3, required 14.8 seconds for the fluid-registration and 2.4 seconds for our proposed volume-preserving algorithm (about 6 times faster).

Perfusion study experiments using an embodiment of the present invention will next be described.

The volumes in this example were acquired with a "Siemens Multislice®" CT scanner (Sensation® 16). They comprise 122 slices (512×512 pixels) with a spatial resolution of 0.742×0.742×2 mm.

Figure 4:
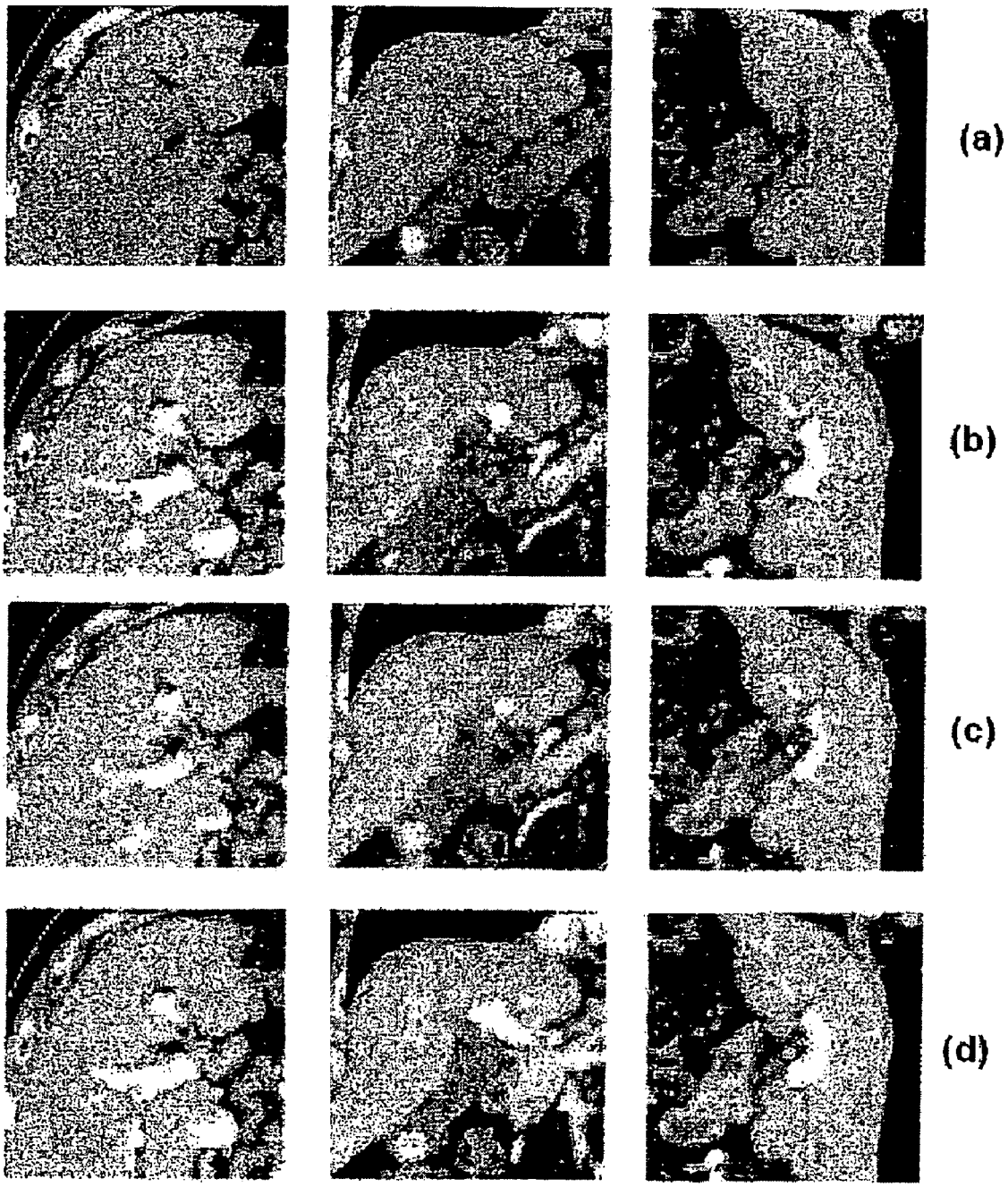
FIG. 4 shows registration results on contrast-enhanced CT volumes for a liver study.
Figure 5:
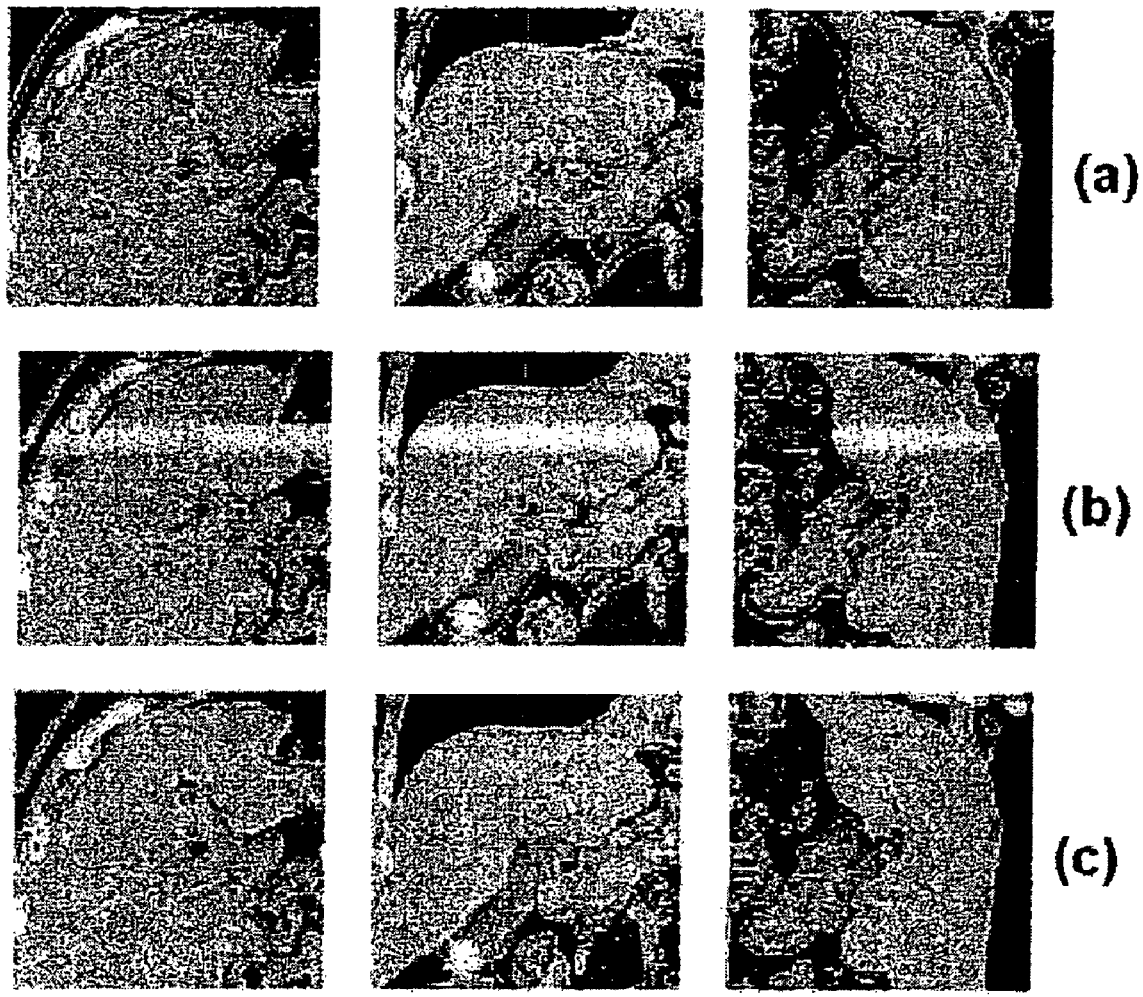
FIG. 5 shows registration results on contrast-enhanced CT volumes for a liver study (edge superposition view)

Here again, we register the venous state to the native state. FIGS. 4 and 5 show three planes of the obtained volumes and involved volumes in the registration process, the xy-, xz- and yz-planes. FIG. 4 shows the registration results on contrast-enhanced CT volumes for a liver study, with axial, coronal, and sagittal views from left to right, respectively. The native phase as a reference volume and the venous phase as a study volume are shown respectively in FIGS. 4(a) and 4(b), (xy, xz, and yz planes). We registered the volumes using an SSD similarity criterion. The fluid registration without any constraint shows reduction of the contrast agent region in FIG. 4 (c), (xy, xz, and yz planes). The volume-preserving constraint imposed on the algorithm shows improvements, FIG. 4(d), (xy, xz, and yz planes).

To visualize alignments or misalignments, we use the contour superimposition technique (FIG. 5). We position the contour of a study (registered or not) on top the reference volume.

FIG. 5(a) shows initial volumes with no registration, with axial, coronal, and sagittal views from left to right, respectively, and shows the contour superimposition of the venous state on the native before any registration, where evident misalignment can be observed.

A classical way to cope with intensity changes is to use a different similarity measure, such as MI, but this produced misalignment in our experiment in FIG. 5 (b), which shows registration using MI criterion without constraint, (xy, xz, and yz planes).

Some areas are registered but mainly the present algorithm fails without constraint. Registration results under the volume-preserving constraint (using an SSD criterion) are satisfactory. Improvements in the alignment after registration are observable in FIG. 5(c) which shows registration using SSD criterion with volume-preserving constraint, (xy, xz, and yz planes). The 3D algorithm also revealed low-dependence on the regularizer (Gaussian smoothing) parameter. Computational times are good and stopping critiera are reached faster with the constraint. Using the SSD as the similarity criteria, it takes about 270 seconds for the fluid registration and about 100 seconds for the volume-preserving constrained approach in our experiments.

The volume-preserving constraint is not always valid in medical imaging. The liver is an essentially incompressible organ but the lung, stomach and intestine are not. Also, the area-preserving constraint might not be valid in 2D experiments where possible axial movement in the unused third dimension is not taken into account.

Figure 6:
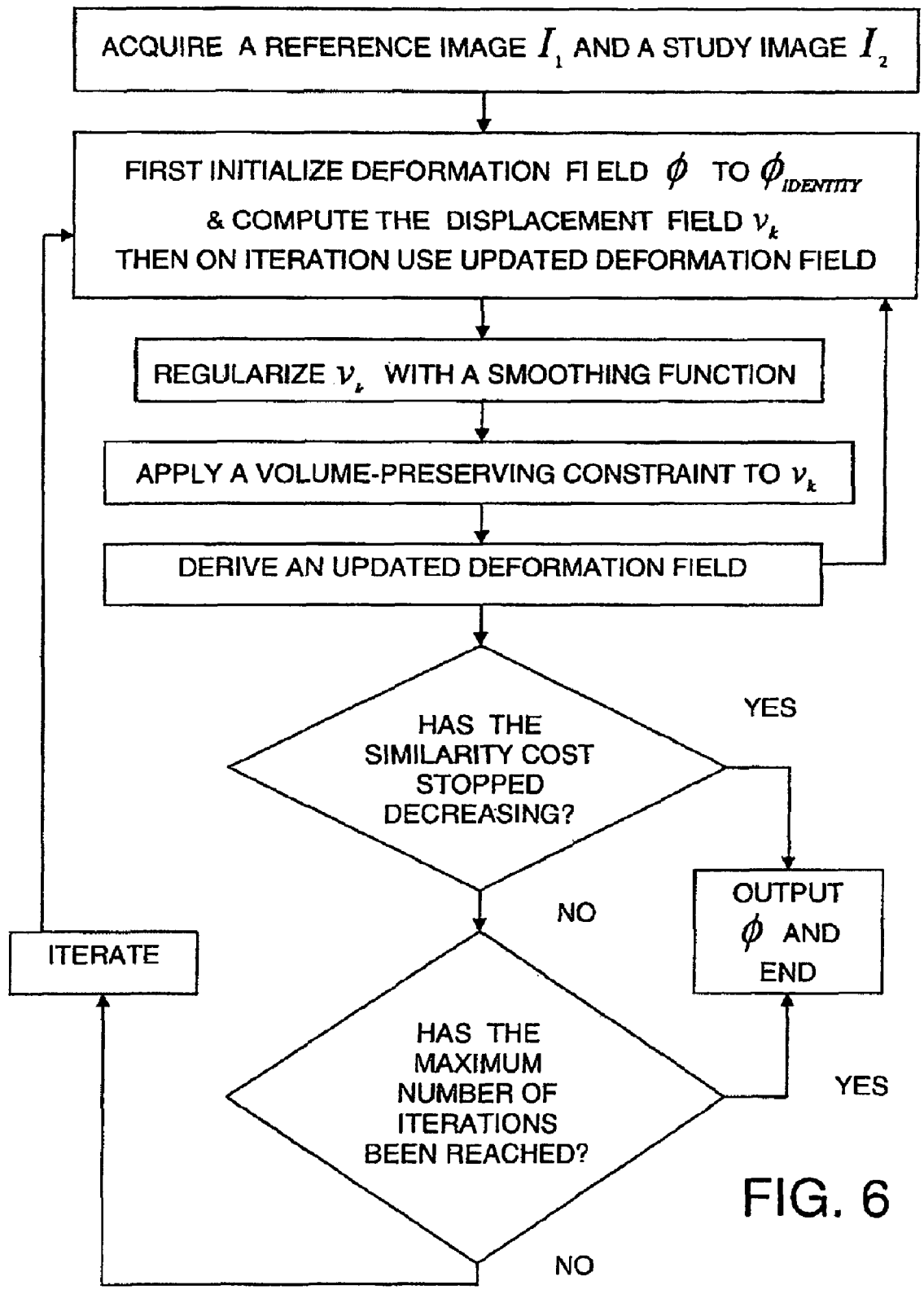
FIG. 6 shows a flow chart of method steps of an embodiment in accordance with principles of the present invention.

FIG. 6 shows a summary flow chart for an embodiment of the invention, in accordance with principles of the invention. Reference and study images are first acquired. The deformation field is initialized to the identity deformation field and the displacement field is computed. The displacement field is regularized with a smoothing filter. In a preferred embodiment of the present invention, smoothing is obtained by using a fast recursive filtering technique that approximates a Gaussian smoothing. A volume-preserving constraint is then applied to the regularized displacement field and an updated deformation field is derived therefrom; this comprises solving a Poisson equation using efficient multigrid methods to project into the divergence-free vector field, that is, subtracting a scalar field $\nabla p$ from $v_k$, where p is a solution of the Poisson equation $\nabla \cdot v_k = \Delta p$, solved using an efficient multigrid method. It will also be understood that the preferred coarse-to-fine iteration heretofore described is applicable herein.

Iteration is then performed with the initialization of the deformation field being set with the updated deformation field. The iterations continue until at least one of the end conditions is reached, namely that the similarity cost, as hereinabove defined, has stopped decreasing and/or a predetermined maximum number of iterations has been performed. When iteration ends, the resulting furthest updated deformation field is outputted.

A 2D version and a 3D version of the algorithm have been implemented. Simulations and experiments show that this approach improves the registration capture range, enforces the incompressibility constraint with a good level of accuracy, and is computationally efficient.

Figure 7:
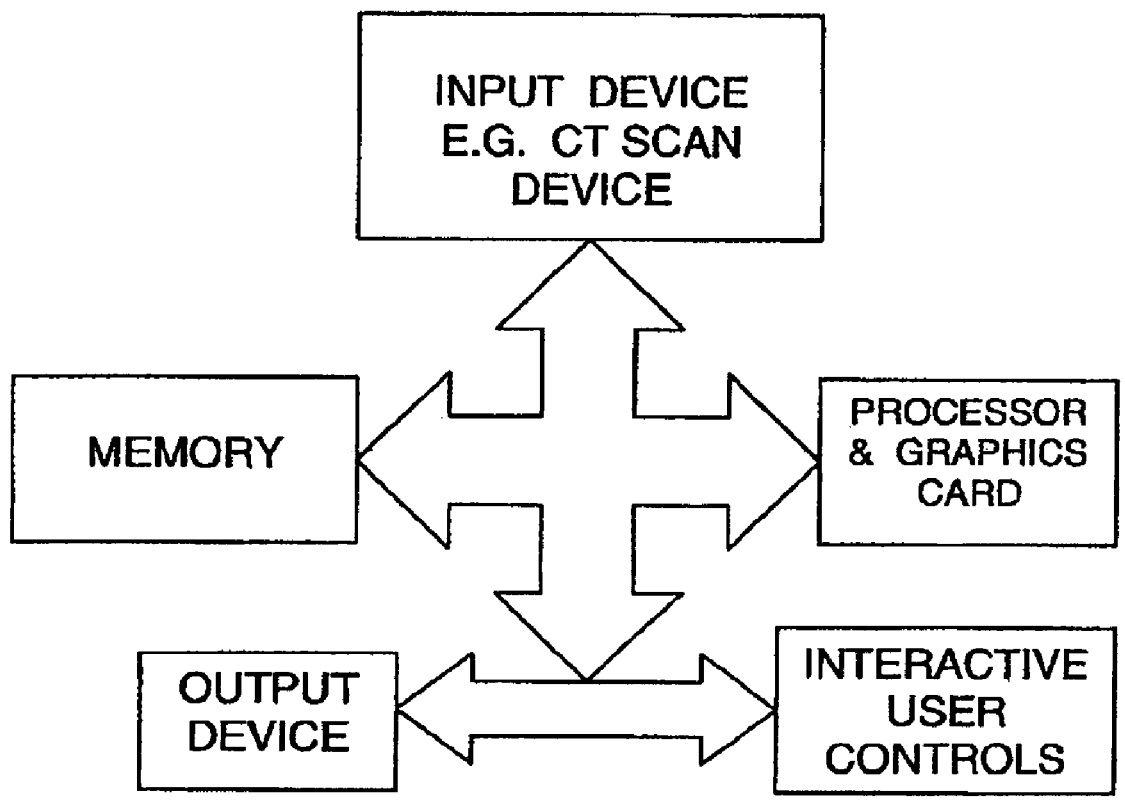
FIG. 7 shows a general block schematic of computer application to the method and system, in accordance with principles of the present invention.

As will be apparent, the present invention is intended to be implemented with the use and application of a programmed digital computer. Images are to be understood as digitized in pixels for 2-dimensional images and voxels for 3-dimensional images, respectively. FIG. 7 shows in basic schematic form a digital processor coupled for two way data communication with an input device, an output device, and a memory device for storing a program and other data. The input device is so designated in broad terms as a device for providing an appropriate image or images for processing in accordance with the present invention. For example, the input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may include a computer type display device using any suitable apparatus such as a cathode-ray kinescope tube, a plasma display, liquid crystal display, and so forth, or it may or may not include a device for rendering an image and may include a memory device or part of the memory device of FIG. 7 for storing an image for further processing, or for viewing, or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing image motion compensation utilizing the method of the present invention.

While the present invention has been explained by way of examples using illustrative exemplary embodiments relating to a method and system for image registration for the alignment of contrast-enhanced CT images utilizing a fluid-based registration algorithm designed to incorporate a volume-preserving constraint, the invention may also be generally applicable to the solution of problems requiring image registration in other fields.

It will be understood that the description by way of exemplary embodiments is not intended to be limiting and that various changes and substitutions not herein explicitly described may be made without departing from the spirit of the invention as defined by the claims following.

What is claimed is:

1. A method for registering images, comprising:
    (a) acquiring a reference image and a study image;
    (b) setting a deformation field to an initial deformation field;
    (c) deriving a similarity measure from said reference and study images and said initial deformation field;
    (d) computing a displacement field from said similarity measure;
    (e) smoothing said displacement field to derive a regularized displacement field;
    (f) applying a volume constraint to said regularized displacement field to derive a constrained displacement field;
    (g) utilizing said constrained displacement field and said initial deformation field for deriving an updated deformation field;
    (h) deriving an updated similarity measure value from said reference and study images and said updated deformation field;
    (i) computing an updated displacement field from said updated similarity measure;
    (j) smoothing said updated displacement field to derive an updated regularized displacement field;
    (k) applying a volume constraint to said updated regularized displacement field to derive an updated constrained displacement field;
    (l) utilizing said updated constrained displacement field and said updated deformation field for deriving a further updated deformation field; and
    (m) iteratively performing steps (h) through (m) until an end condition is met, whereupon ending iteration and outputting a furthest updated deformation field.

2. A method for registering images as recited in claim 1, wherein:
    said step (b) for setting a deformation field to an initial deformation field comprises setting said deformation field to zero.

3. A method for registering images as recited in claim 1, and for performing steps of said method in a coarse-to-fine framework:
    in a first performance in a relatively coarse resolution;
    in subsequent performances in respective progressively finer resolutions;
    wherein, for said first performance, said step (b) comprises setting said deformation field to zero; and
    wherein, for each of said subsequent performances, said step (b) comprises setting said deformation field to a respective updated deformation field from the immediately preceding performance.

4. A method for registering images as recited in claim 1, wherein:
    said step (c) for deriving a similarity measure value comprises deriving the sum of squared differences, local cross-correlation, and mutual information for said images.

5. A method for registering images as recited in claim 1, wherein:
    said step (d) for computing a displacement field comprises:

deriving the gradient of said similarity measure, and determining said displacement field as following said gradient.

6. A method for registering images as recited in claim 1, wherein:
said step (e) for smoothing said displacement field comprises utilizing a fast recursive filtering technique approximating a Gaussian smoothing.

7. A method for registering images as recited in claim 1, wherein:
said step (f) for applying a volume constraint comprises applying a substantially divergence-free constraint upon said regularized displacement field comprising solving a Poisson equation using a multi-grid method.

8. A method for registering images as recited in claim 1, wherein:
said step (g) for utilizing said constrained displacement field and said initial deformation field for deriving an updated deformation field comprises using a control parameter in an updating step to ensure that the extent of updating does not exceed one voxel.

9. A method for registering images as recited in claim 1, wherein said end condition comprises ending when a given maximum number of iterations has been performed.

10. A method for registering images as recited in claim 9, wherein said end condition comprises ending when a similarity cost stops decreasing.

11. A computerized system for registering a first digital image of an organ and a second digital image of said organ being contrast-enhanced comprising:
a memory device for storing a program and other data; and
a processor in communication with said memory device, said processor being operative with said program to perform:
(a) acquiring a reference image and a study image;
(b) setting a deformation field to an initial deformation field;
(c) deriving a similarity measure from said reference and study images and said initial deformation field;
(d) computing a displacement field from said similarity measure;
(e) smoothing said displacement field to derive a regularized displacement field;
(f) applying a volume constraint to said regularized displacement field to derive a constrained displacement field;
(g) utilizing said constrained displacement field and said initial deformation field for deriving an updated deformation field;
(h) deriving an updated similarity measure value from said reference and study images and said updated deformation field;
(i) computing an updated displacement field from said updated similarity measure;
(j) smoothing said updated displacement field to derive an updated regularized displacement field;
(k) applying a volume constraint to said updated regularized displacement field to derive an updated constrained displacement field;
(l) utilizing said updated constrained displacement field and said updated deformation field for deriving a further updated deformation field; and
(m) iteratively performing steps (h) through (m) until an end condition is met, whereupon ending iteration and outputting a furthest updated deformation field.

12. A system for registering images as recited in claim 11, and for operating said system in a coarse-to-fine framework:
in a first operation in a relatively coarse resolution;
in subsequent operations in respective progressively finer resolutions;
wherein, for said first operation, said setting a deformation field to an initial deformation field comprises setting said deformation field to zero; and
wherein, for each of said subsequent operations, said setting a deformation field to an initial deformation field comprises setting said deformation field to a respective updated deformation field from the immediately preceding operation.

13. A system for registering images as recited in claim 11, wherein:
said deriving a similarity measure value comprises deriving the sum of squared differences, local cross-correlation, and mutual information for said images.

14. A system for registering images as recited in claim 11, wherein:
said computing a displacement field comprises:
deriving the gradient of said similarity measure, and determining said displacement field as following said gradient.

15. A system for registering images as recited in claim 11, wherein:
said smoothing said displacement field comprises utilizing fast recursive Gaussian filtering.

16. A system for registering images as recited in claim 11, wherein:
said applying a volume constraint comprises applying a substantially divergence-free constraint upon said regularized displacement field, comprising solving a Poisson equation with a multi-grid method.

17. A system for registering images as recited in claim 11, wherein:
said utilizing said constrained displacement field and said initial deformation field for deriving an updated deformation field comprises using a control parameter in an updating operation to ensure that the extent of updating does not exceed one voxel.

* * * * *